Nov. 20, 1945. I. A. WINTER Re. 22,694

AUTOMATIC STOKER

Original Filed March 31, 1941 3 Sheets-Sheet 1

INVENTOR:
Ireal A. Winter,
BY
Pierce & Scheffler,
ATTORNEYS.

Nov. 20, 1945. I. A. WINTER Re. 22,694

AUTOMATIC STOKER

Original Filed March 31, 1941 3 Sheets-Sheet 2

INVENTOR:
Ireal A. Winter,
BY
Pierce & Scheffler,
ATTORNEYS.

Nov. 20, 1945. I. A. WINTER Re. 22,694

AUTOMATIC STOKER

Original Filed March 31, 1941 3 Sheets-Sheet 3

INVENTOR:
Ireal A. Winter,
BY Pierce & Scheffler,
ATTORNEYS.

Reissued Nov. 20, 1945

Re. 22,694

UNITED STATES PATENT OFFICE 22,694

AUTOMATIC STOKER

Ireal A. Winter, Birmingham, Ala.

Original No. 2,341,252, dated February 8, 1944, Serial No. 386,153, March 31, 1941. Application for reissue January 22, 1945, Serial No. 573,960

20 Claims. (Cl. 110—45)

This invention relates to automatic stokers for the burning of solid fuel, and particularly to fully automatic stokers and ash removal systems for use in home and apartment house heating plants, and in industrial installations.

Objects of the invention are to provide automatic stokers of novel design, and of novel combustion characteristics, in which various types of anthracite and bituminous coals may be burned with equal ease and facility. An object is to provide an automatic stoker in which the fuel and air passages are so related, and the ash is continuously removed in such manner, that the fuel burns with a torchlike flame. An object is to provide an automatic stoker including a rotary hearth, mechanism for feeding crushed coal upwardly through the hearth, passages for supplying combustion air at regions that result in a fuel bed of substantially constant depth and surrounded by an ash bed that protects the hearth from damage, and devices for agitating the ashes and preventing the formation of a clinker ring. A further object is to provide an automatic stoker of the stated rotary hearth type in which the hearth is retained upon its support by the weight of the hearth and the coal and ash upon the hearth, the hearth being rotated by a rotary screw conveyor that removes the ashes to a remote point.

These and other objects and advantages of the invention will be apparent from the following specification when taken with the accompanying drawings in which.

Figure 6:
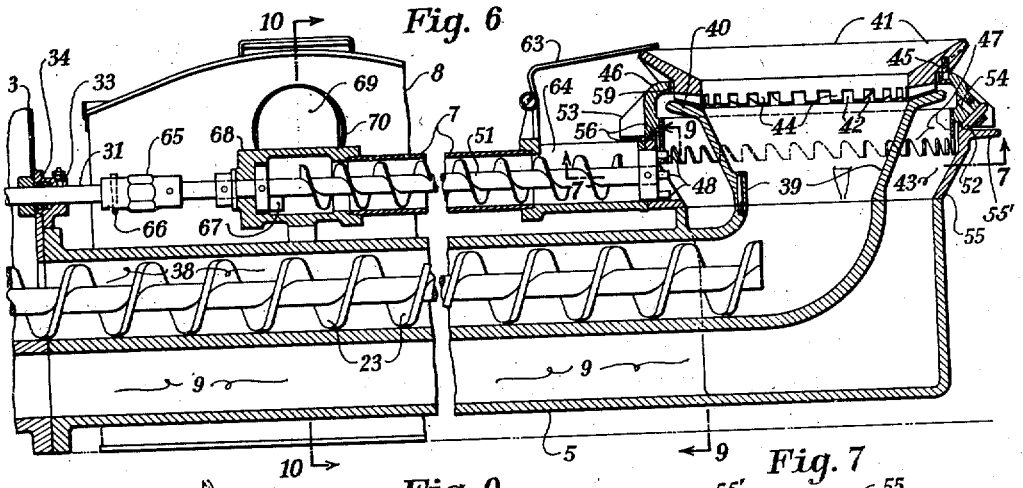
Fig. 6 is a fragmentary section, on an enlarged scale, taken on the plane of line 6—6 of Fig. 1.
Figure 9:
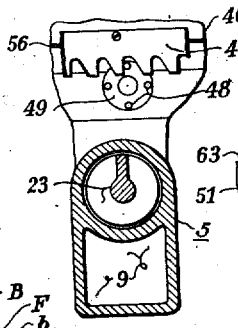
Figure 10:
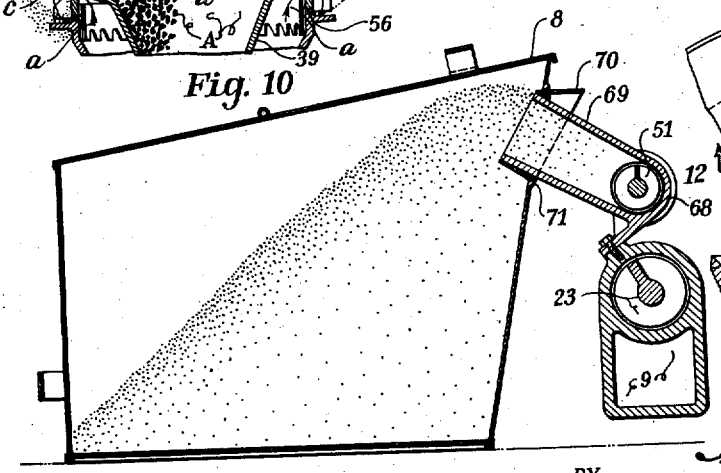
Figure 11:
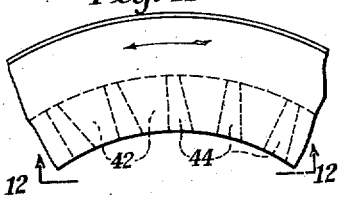
Figure 12:
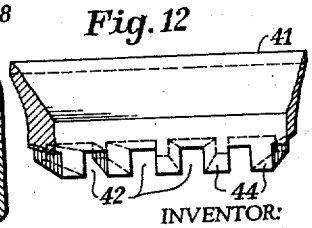
Figure 13:
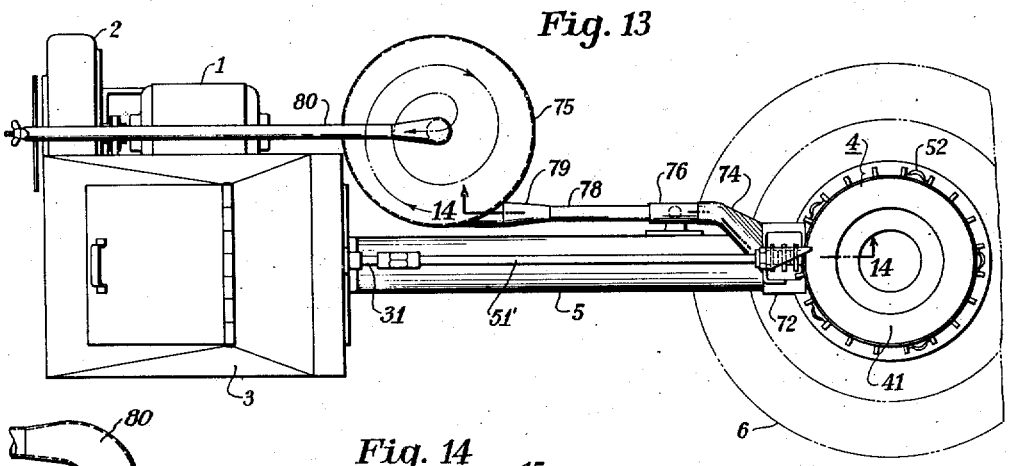
Figure 14:
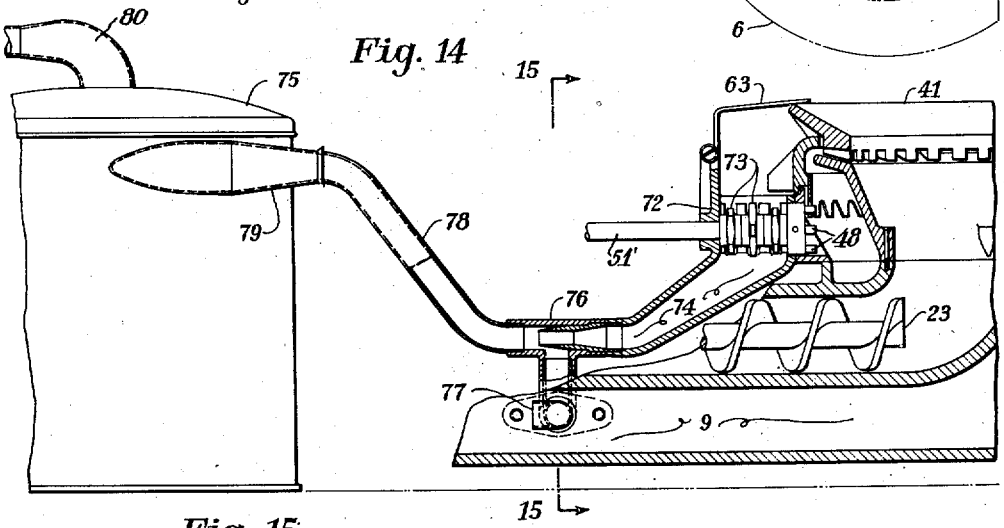
Figure 15:
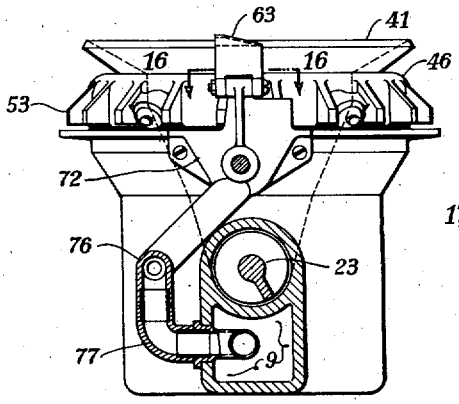
Figure 16:
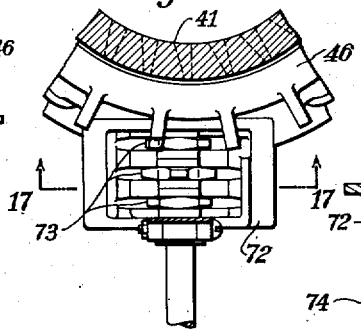
Figure 17:
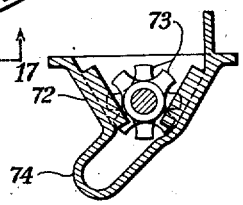

Figs. 9 and 10 are fragmentary transverse sections on the planes of lines 9—9 and 10—10, respectively, of Fig. 6;

Fig. 11 is an enlarged and fragmentary plan view of the rotating hearth and tuyère;

Fig. 12 is a sectional view taken on the plane of line 12—12 of Fig. 11;

Fig. 13 is a fragmentary plan view of another embodiment of the invention that includes an automatic pneumatic ash remover;

Fig. 14 is a fragmentary section, on an enlarged scale, taken on the plane of line 14—14 of Fig. 13;

Fig. 15 is a vertical section taken on the plane of line 15—15 of Fig. 14;

Fig. 16 is a fragmentary enlarged section taken on the plane of line 16—16 of Fig. 15; and Fig. 17 is a fragmentary section taken on the plane of line 17—17 of Fig. 16.

Figure 3:
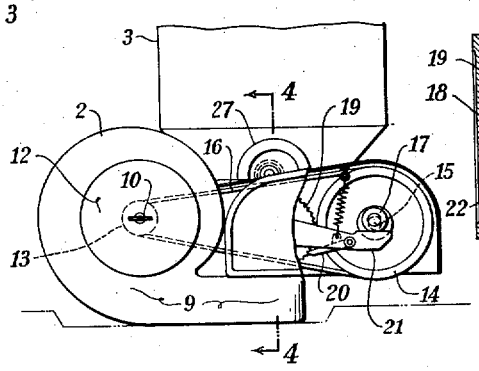
Fig. 3 is a fragmentary end elevation, with parts in section, as viewed from the plane indicated by line 3—3 of Fig. 2.

In the drawings, the reference numeral 1 identifies a motor that drives the blower 2 and the associated fuel feed mechanism by which the combustion components, i. e., air from the blower 2 and crushed fuel from the hopper 3, are supplied to the burner 4 through the dual passages of the tubular member 5. The burner is located in the usual position within the furnace 6, and ashes are removed from the interior of the furnace through an ash tube 7 and deposited in an ash hopper 8. The volume of air delivered to the burner through the air passage 9 at the bottom of the tubular member 5, see Figs. 3, 6 and 9, is regulated by the thumbscrew 10 that controls the air inlet opening 11 between the blower manifold and the intake orifice plate 12.

The blower shaft is directly driven by the motor shaft but the fuel and ash conveyors are driven at low speed, and intermittently, through a transmission including sheaves 13, 14 on the motor shaft and a countershaft 15, respectively and a V-belt 16. The shaft 15 carries an eccentrically mounted roller bearing 17 that imparts rotation to the fuel feed drive shaft 18 through the ratchet wheel 19, spring-returned pawl 20 and rocker arm 21. The eccentricity of the ball bearing 17 is adjustable by known mechanism, not shown, to provide a regulation of the rate of fuel supply.

A shear pin 22 couples the hub of the ratchet wheel 19 to the stub shaft 18 to prevent damage upon a fouling of the fuel feed screw 23 that has a squared end seated in a correspondingly shaped socket in the enlarged inner end of the shaft 18. A lubricated roller bearing 24 is mounted on the sheave guard 25 to support the stub shaft 18, the inner end of the bearing being protected from dirt by a felt packing 26.

Figure 4:
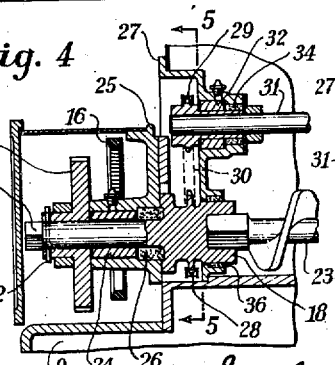
Fig. 4 is a fragmentary transverse section, on an enlarged scale, taken on the plane of line 4—4 of Fig. 3.
Figure 5:
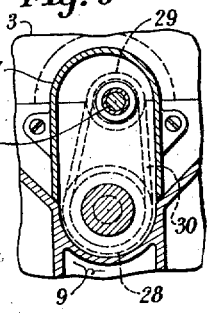
Fig. 5 is a fragmentary section taken on the plane of line 5—5 of Fig. 4.

A casting or plate member 27 is mounted on the lower front portion of the fuel hopper 3 to form a housing for the sprockets 28, 29 and chain 30, see Figs. 4 and 5, that drive the ash conveyor shaft 31 from the stub shaft 18. The roller bearing 32 in the housing member 27, and the bracket 33 on the fuel hopper 3, Fig. 6, assure proper alinement of the ash screw shaft 31 while the felt packings 34 protect the bearings from the intrusion of coal dust from the hopper. The enlarged end of the drive shaft 18 extends into the fuel hopper through the housing plate 27, and a felt packing 36 seals the shaft to prevent the escape of fuel at this point.

The upper passage of the tubular member 5 comprises the fuel feed tube 38 that is turned upwardly, at its inner end, to open into and to support the stationary conical retort 39, that flares outwardly to terminate in a slightly concaved annular flange 40. The burner ring or rotating hearth 41 is located immediately above the flange 40 and a large number of tuyère orifices 42 are provided between these members to admit combustion air to the retort and hearth from the annular air chamber 43 at the upper end of the air supply passage 9. The tuyère orifices are preferably formed in the base of the rotating hearth by deep notches between the lugs 44 that have lower faces conforming to the curvature of the flange 41 and spaced from the flange by a small clearance of, for example, about $\frac{1}{32}$ inch. The cross-sectional area of each tuyère is substantially constant, and the air velocity through the tuyère is therefore practically constant, but the circumferential length and the axial height of the tuyère vary progressively along the radial length of the tuyère to provide a long and shallow inlet opening at the outer edge of the hearth 41 and a short and deep outlet opening at the inner edge of the hearth.

As shown in Figs. 6, 7, 11 and 12, the side walls of each tuyère orifice are plane surfaces, and the top and upper walls are conical surfaces of different slope comprising, respectively, the flange 40 and the upper surfaces of the hearth 41 between the lugs 44. The inner ends of the tuyère orifices are approximately square with an aggregate circumferential length of about 180°, and a relatively large number of orifices are used to distribute the air efficiently around the burner and to direct the jets into the fuel bed. Any ash or small clinkers that may collect in the tuyère orifices 42 and on the retort flange 40, during periods of quiescence when the burning is of a slow smoldering character, are loosened and scraped back into the retort by a plowing action of the lugs 44 or are blown back by the air blast.

Figure 7:
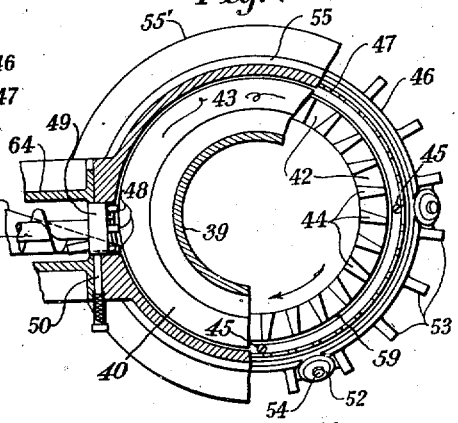
Fig. 7 is a fragmentary horizontal section taken on the plane of line 7—7 of Fig. 6, with parts broken away to show the rotating elements in plan.

The hearth 41 is rigidly secured by screws 45 to the ash scraper ring 46 that is intermittently rotated by the attached tooth ring 47 and drive pins 48 on a collar 49 on the end of the ash conveyor screw 51, Figs. 6, 7 and 9. The collar 49 is lubricated by a spring loaded graphite stick 50 carried by the casing. The pitch of the pins 48 is somewhat greater than that of the teeth of the ring 47 and the centerline of the ash screw 51 and collar 49 is offset from the axis of the toothed ring 47, thus limiting the engagement of the drive pins 48 with the teeth 47 to a horizontal approach to and a downward movement along the vertical flanks of the teeth. This operating characteristic is important since the hearth 41 and the ash scraper ring 46 are retained in place on the burner solely by their weight. Supporting wheels 52 are secured to the ring 46 between certain of the radially projecting fins 53, the wheels being mounted on inclined shafts 54 for supporting the hearth and ash scraper ring upon the housing member 55. The double-coned wheels 52 roll along the inner edge of the annular flange 55' that projects radially from the housing member 55 at a point slightly below its upper edge. The upper part of the member 55 thus forms a cylindrical guide for centering the rotatable assembly to maintain a small clearance 56 between the ash scraper ring 46 and the housing member 55. This clearance is essential as the resulting flow of air from the annular chamber 43 sweeps across the supporting flange 55' to remove ashes from the wheel track and to provide preheated secondary air for rapid and efficient combustion of gases above the fuel bed. Additional preheated secondary air is supplied through the annular orifice 59 between the upper edge of the ash scraper ring 46 and the hearth 41.

Figure 1:
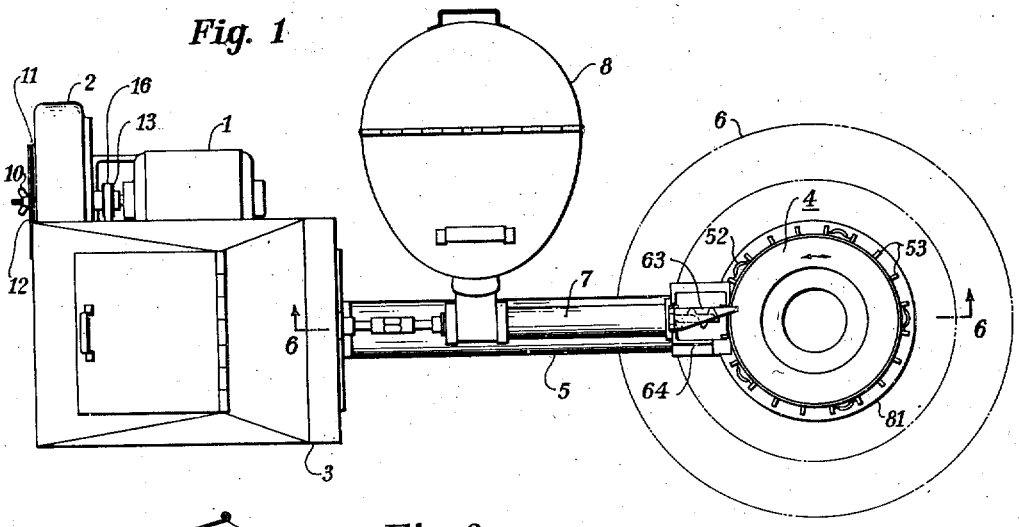
Fig. 1 is a plan view of a stoker and automatic mechanical ash remover embodying the invention.
Figure 2:
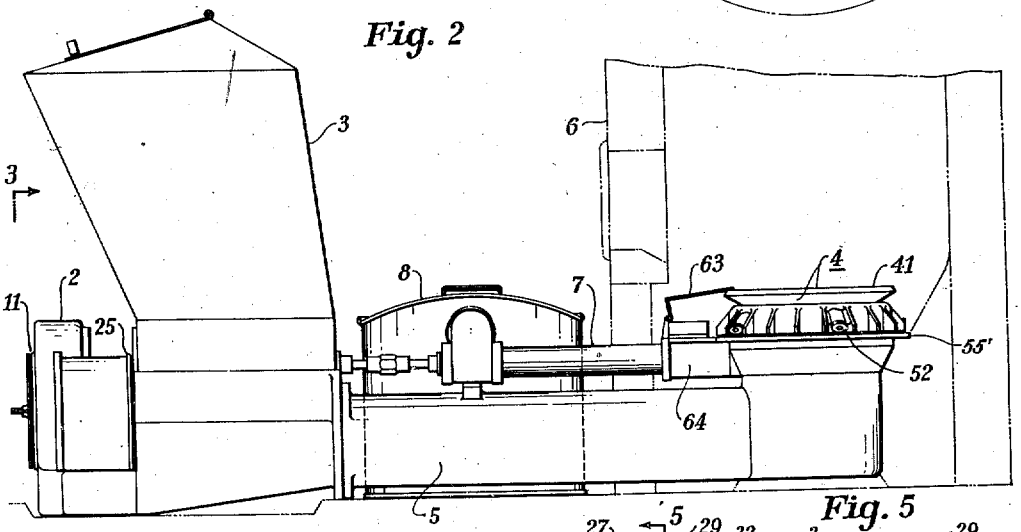
Fig. 2 is a side elevation of the same.

A rake 63 is hinged upon the open topped ash hopper 64 that is secured to the housing 55 of the burner and supports the inner end of the ash removal tube 7, Figs. 1, 2 and 6. The rake 63 is a tapered metal plate with its smaller end or point resting upon the edge of the rotating hearth 41 to agitate the ash bed and prevent the formation of the large annular clinker ring that is characteristic of some prior rotating hearth burners. The hinged mounting of the rake permits easy removal of the hearth and ash scraper ring, and also permits the rake to ride over any unburned embers that may be present in the ash, thus serving to expose the embers to the surrounding air to facilitate complete combustion. The tapered construction of the rake protects it from destruction as the large radiating surface outside of the fuel bed dissipates heat more rapidly than it is absorbed by the small inner end that is exposed to the ash and fuel bed.

The ash conveyor screw 51 is connected to the ash screw shaft 31 by a coupling 65 and shear pin 66. An agitating arm 67 is secured to the ash screw within the discharge T 68 from which the outlet branch 69 slopes upwardly to deliver the ashes to the ash can 8. The agitating arm 67 prevents the ash from packing tightly in the end of the discharge T, and stirs and aerates the ash to maintain the condition of semi-fluidity that is essential to a free flow of the ash. The blade of the ash screw 51 does not extend to the agitating arm 67 but terminates at about the center line of the outlet branch 69, thus leaving a small space in which the ash is relatively at rest. The agitating arm and the exposed end of the screw move the ash up the outlet branch by a pumping action at each rotation of the ash screw and, since the displacement of the ash screw is about three times the volume of ash being removed, the zone of non-agitation forms a storage pocket that prevents a constant grinding of the ash between the rotating parts and the wall of the discharge T. The cross-sectional area of the discharge branch 69 increases towards the discharge end to prevent the ash from packing, the increase being equivalent to that of a conical tube of from 2° to 5° total included angle. The cross-section of the outlet branch preferably varies progressively from a square inner end, Fig. 6, to the cylindrical outer end upon which the thin conical shield 70 is fixed. The ash can 8 has a circular opening 71 which fits over the conical shield 70 and, under a slight pressure, deforms the conical shield to form a tight seal between the ash can and the ash conveyor system. The ashes are transported by the screw 51 as a slowly moving mass, resembling plastic flow, and the upward inclination of the discharge branch 69 provides a body of ashes that forms a seal to prevent the escape of pressure air, and entrained fine ash, from the interior of the furnace.

Figure 8:
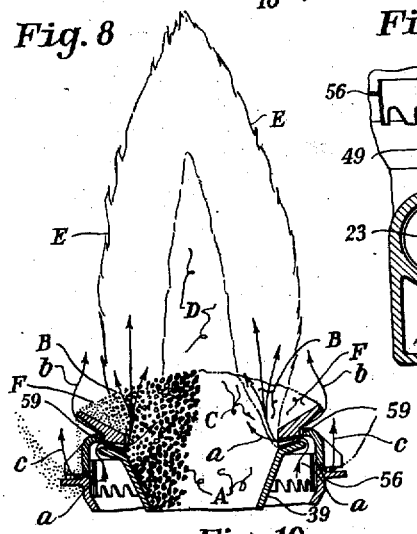
Fig. 8 is a fragmentary vertical section through the burner, and shows the combustion phases, air flow and other elements of the burning process.

The phases and elements of combustion for the burner are illustrated in Fig. 8. The body of fuel A is forced upward into the conical retort 39 by the feed screw 23, and is ignited in the region B by air blasts *a* that are directed inwardly through the tuyère orifices 42. The fuel bed is agitated by the intermittent rotation of the hearth 41, through the toothed wheel 47 and pins 48, and the air readily penetrates to the interstices of the burning fuel and effects rapid and efficient combustion. A portion of the air and gas which has been preheated in the annular combustion region B is forced inwardly to supplement radiant heat from region B in preheating the fuel in the interior zone C, thereby driving off the gas and volatile matter to form a cone D above the fuel bed. The remainder of the primary air from the tuyère serves to complete the combustion of the outwardly mushrooming degasified fuel from the region C, while secondary air preheated by cooling contact with the outer surfaces of the burner, namely, the retort 39 including its flange 40, ash scraper ring 46 including its fins 53, flange 55′, and hearth 41, issues from the annular orifice 59 and the clearance 56, as indicated by arrows *b*, *c*, respectively, to effect the complete combustion of the gases of cone D in the torchlike flame E. These secondary air streams flow along the rotating hearth and ash scraper ring to protect them against overheating and warping.

The bed F of ashes and embers which overlies the outer flange of the rotating hearth 41 acts as an insulation for the hearth and also serves to maintain a fuel bed of sufficient depth to force the air blasts *a* into the incoming body of fuel A to preheat it, and to prevent the upwardly moving air streams from blowing the fuel from the burner at the combustion region B. The depth of the burning region B is thus governed by the slope of the outer flange of the hearth 41, and this slope may be selected in accordance with the weight and burning characteristics of the fuel. The illustrated slope of about 35 degrees is appropriate for various grades of lignite, bituminous and anthracite coal but a greater slope may afford more efficient operation when burning coke or sawdust.

The described process of burning the fuel results in a high burner efficiency, both with respect to the quantity of fuel which may be burned in a given time and with respect to the heat value received per unit of fuel. Further, since combustion within the burner is confined to the small annular region B and producing a flame which, both in appearance and the rapidity with which it builds up from quiescence, resembles that produced by an oil burner, overheating of the parts is prevented as is attested by the fact that after a short period of quiescence during which burning recedes into the retort, the ashes can be scraped away and the burner lifted out using only a gloved hand. The protection of the burner parts from destructively high temperatures results from the described paths of flow of the combustion air through and around the burner. The combustion zone B is spaced from the metal parts by the incoming fuel A or by the ash bed F, and the secondary air streams flow along and cool the outer portion of the burner, being thereby preheated to effect a quick and efficient combustion of the gases that rise above the fuel bed.

The supply of fresh fuel forces ashes outwardly from the rim of the ash bed F, and this flow is facilitated by the slight shaking action resulting from the step-by-step movement of the rotary hearth 41 and by the scraping action of rake 63 that prevents the formation of a clinker ring. The ash falls upon the radial flange 55′ of the housing 55, and is swept along the flange and into the ash hopper 64 by the fins 53 of the ash scraper ring 46. The removal of ash is essential to stable burner operation and the illustrated construction has a number of structural features or operating characteristics that are of major importance. It is essential that the clearance 56 between the radial flange 55′ and the lower edges of the ash scraping fins 53 be small. Ashes and clinkers are forced along the flange by the fins 53, and the clearance must be limited to prevent clinkers from lodging under the fins and thus lifting the hearth 41 that is retained in position by gravity. Another feature that prevents an inadvertent lifting of the hearth is the cutting back of the ash screw 51 so that no part, or only a small part, of the screw extends beneath the fins 53. Insufficient clearance at this point might allow clinkers to jamb between the screw 51 and the fins 53, thereby lifting the hearth 41 to disengage the toothed wheel 47 from the drive pins 48 and thus preventing further rotation.

A relatively large quantity of ash will accumulate within the burner during quiescent operation and, when the burner is again operated at full capacity, the rate of ash discharge from the burner may exceed the capacity of the ash screw 51 for a short interval. The excess quantity of ashes is temporarily stored upon the flange 55′ of the housing 55, between the fins 53, and is eventually removed through the ash hopper 64 when the ash screw "catches up" with the rate of ash discharge.

In an alternative embodiment of the invention, as shown in Figs. 13 to 17, inclusive, the ashes are removed by a pneumatic system. In general, the burner and associated mechanisms may be substantially as previously described and like parts are therefore designated by corresponding reference numerals but will not be described in detail.

The drive pins 48 for the rotary hearth are carried by a shaft 51′ that is alined with and coupled to the shaft 31. The shaft 51′ extends through the ash hopper 72 and carries crusher wheels 73 for breaking up clinkers before they enter the outlet section 74 of the ash hopper. The ashes and finely ground clinkers that collect in the section 74 are sucked away and blown into the ash can 75 by the ejector 76 which receives an air blast through the connecting pipe 77 that extends into the pressure air passage 9. The air and ash stream is delivered to the ash can 75 through the tube 78 which has the diffusing section 79 for decreasing the velocity of the stream as it approaches the ash can. The air and ash stream enters the ash can tangentially and the imparted swirl will effect a separation of the solids from the air by centrifugal force. The air vent 88 is placed at the center of the can where the suspended ash is at a minimum; but as a further precaution against the escape of finely divided ash and gas, the vent pipe 80 is carried to the intake orifice on the blower 2, thus providing a closed circulation system which aids in removing ashes to the ash can 75 by reducing the back pressure on the ejector 76.

The ash can 75, which for convenience of illustration has been shown adjacent to the stoker, can be located anywhere that may be desired, such as in the alley, in which case the vent 88 would be unnecessary. This feature would be highly desirable in large installations, since the ash could be readily removed to a large storage space without the necessity for local handling of large quantities of ash.

Whereas in the foregoing specification there has been described the specific embodiments of my invention for the purpose of disclosing its novelty, flexibility and economic value, it is, nevertheless, to be understood that in practicing the same, I may resort to any and all combinations and modifications falling within the scope of the appended claims defining the invention.

I claim:

1. An underfeed stoker comprising a stationary upwardly flaring conical retort member, a rotatable annular hearth member supported above and concentric with said retort, means for forcing fuel upwardly through said retort and hearth member, a pressure air chamber surrounding said retort, said annular hearth member having tuyère passages in the underside thereof for discharging air from said pressure air chamber radially into the fuel bed and having a conical upper surface sloping outwardly and upwardly from the upper end of said stationary retort for supporting an annular fuel and ash bed of sufficient depth to confine the flow of air entering through said tuyères to the central portion of the fuel bed within the hearth and retort, and means for rotating the hearth member.

2. An underfeed stoker as claimed in claim 1, in combination with a horizontally hinged rake mounted laterally of the hearth and having the tip thereof resting upon the upper edge of the rotatable hearth, thereby to prevent the formation of a clinker ring about the combustion zone.

3. An underfeed stoker comprising an upwardly flaring conical retort member terminating at its upper end in an outwardly flaring annular flange a rotatable hearth member disposed above said annular flange, means for forcing fuel upwardly through said members, a pressure air chamber surrounding said retort, and tuyère orifices comprising recesses in the under surface of said hearth member facing the annular flange of said retort, wherein each tuyère orifice is of substantially constant cross-sectional area through the length thereof, and is of less height at its air entrance end than at its air discharge end.

4. An underfeed stoker comprising an upwardly flaring conical retort member terminating at its upper end in an outwardly flaring annular flange, a rotatable hearth member disposed above said annular flange, means for forcing fuel upwardly through said members, a pressure air chamber surrounding said retort and multiplicity of tuyère orifices comprising recesses in the under surface of said hearth member facing the annular flange of said retort, said multiplicity of tuyère orifices having an aggregate circumferential length of approximately 180° at the interior wall of the member in which said orifice-defining recesses are formed, each adjacent pair of recesses being spaced apart at said wall by an intervening wall of substantially the same circumferential length as one of said recesses.

5. In an underfeed stoker, a stationary upwardly flaring retort, a rotatable hearth above said retort having an outwardly and upwardly flaring ash supporting flange, and a horizontally hinged rake supported laterally of said hearth whereby it can be raised or lowered over the fuel bed and having an active end thereof adapted to extend into a bed of fuel or ash on said flange, said rake being tapered to provide a large heat-radiating surface spaced from the hearth to cool the small active end of the rake that contacts the bed.

6. In an underfeed stoker, a stationary conical retort, a housing member surrounding said retort having a radial flange adjacent the upper end thereof, a rotatable assembly comprising an annular hearth member of less circumference than said flange disposed above and concentric with said retort and an ash scraper ring secured to said hearth member and having radial fins extending over said flange on said housing member, wheels mounted on said rotatable assembly and bearing on said flange to support said assembly thereon, an ash hopper adjacent said housing member positioned to receive ash falling on said flange over the edge of said hearth and swept from said flange by said fins, means for removing ash from said hopper, means for forcing fuel upwardly through said retort and hearth, means for forcing air into said housing and retort and means for rotating said assembly comprising said hearth and ash scraper ring.

7. In an underfeed stoker, the invention as claimed in claim 6, wherein said wheels support said assembly above said flange to provide an opening through which air flows to blow ashes from said flange, thereby cleaning the track upon which said wheels rotate.

8. An underfeed stoker comprising a stationary upwardly flaring retort member, a rotatable annular hearth member supported above and concentric with said retort member, means for forcing fuel upwardly through said members, a pressure air chamber surrounding said retort, one of the aforesaid members having tuyère passages provided therein for discharging air from said pressure air chamber into the upwardly moving fuel bed, said hearth member having an upwardly flaring upper surface extending upwardly from the level of the tuyère passages for supporting an annular fuel and ash bed of sufficient depth to provide for combustion taking place between the level of the tuyère passages and the top of said hearth member and confine the flow of air entering through said tuyère passages to the central portion of the fuel bed within the hearth and retort members, and means for rotating the hearth member.

9. An underfeed stoker as claimed in claim 8, in combination with a horizontally hinged rake mounted laterally of the hearth whereby it can be raised or lowered over the fuel bed and having the tip thereof located adjacent the upper edge of the hearth and adapted to extend into a bed of fuel or ash on said hearth, whereby to prevent the formation of a clinker ring about the combustion zone.

10. An underfeed stoker comprising an upwardly flaring retort member, a rotatable hearth member disposed over said retort member, means for forcing fuel upwardly through said members, a pressure air chamber surrounding said retort member, and tuyère passages provided in one of the aforesaid members for discharging air from said pressure air chamber into the upwardly moving fuel bed, each tuyère passage being of substantially constant cross-sectional area throughout the length thereof and being of less vertical dimension at its air entrance end than at its air discharge end.

11. An underfeed stoker comprising an upwardly flaring retort member, a rotatable hearth member disposed over said retort member, means for forcing fuel upwardly through said members, and a pressure air chamber surrounding said retort, one of the aforesaid members having tuyère passages provided therein in circumferentially spaced relation for discharging air from said pressure air chamber into the upwardly moving fuel bed, said passages having an aggregate circumferential length of approximately 180° at the interior wall of the member in which said passages are provided, each adjacent pair of passages being spaced apart at said wall by an intervening wall of substantially the same circumferential length as one of said passages.

12. In an underfeed stoker, a stationary upwardly flaring substantially circular retort, a housing member surrounding said retort having an outwardly projecting flange adjacent the top thereof, a rotatable hearth ring of smaller radius than said flange disposed above and concentric with said retort, an ash scraper ring turning with said hearth ring and having outwardly projecting fins sweeping over said flange, supporting means for said hearth ring and ash scraper ring bearing on said flange, an ash hopper positioned to receive ash falling from said hearth ring onto said flange and swept from said flange by said fins, means for forcing fuel upwardly through said retort and hearth ring, means for removing ash from said hopper, means for forcing air through said housing and retort for passage through the upwardly moving fuel bed, and means for rotating said hearth ring and ash scraper ring.

13. In an underfeed stoker, the invention as claimed in claim 12, wherein said supporting means for said hearth ring and ash scraper ring support the same in spaced relation to and above said flange so as to provide an annular opening therebetween communicating with the inside of said housing through which air flows to blow ashes from said flange, thereby cleaning the track upon which said supporting means bears.

14. An underfeed stoker comprising a stationary upwardly flaring retort member, a rotatable annular hearth member supported above and concentric with said retort, means for forcing fuel upwardly through said retort and hearth member to form a fuel bed, a pressure air chamber surrounding said retort, said hearth member and retort member together defining a partition separating the fuel bed from the air chamber, said partition containing a plurality of tuyère passages for discharging air from the air chamber into the fuel bed, the air chamber wall being spaced a short distance from the hearth member to provide a passage for air to flow from the air chamber upwardly along the outer surface of the hearth to supply preheated secondary air for the flame and also cool said hearth, the annular hearth member having an upwardly flaring upper surface for supporting an annular fuel bed, and means for rotating the hearth relative to the retort member.

15. An underfeed stoker comprising a stationary upwardly flaring retort member, a rotatable annular hearth member supported above and concentric with said retort, means for forcing fuel upwardly through said retort and hearth members to form a fuel bed, a pressure air chamber surrounding said retort, said hearth member and retort member together defining a partition separating the fuel bed from the air chamber, said partition containing a plurality of tuyère passages for discharging air from the air chamber into the fuel bed, the annular hearth member having an upwardly flaring upper surface for supporting an annular fuel and ash bed, means for rotating the hearth relative to the retort member, the pressure chamber wall having an annular flange whose plane is perpendicular to the axis of hearth rotation, hearth supporting means movably engaging the flange, means providing a passage communicating with the air chamber for directing a stream of air outwardly over the flange to remove ashes from the track of the hearth supporting means, and means for rotating the hearth relative to the retort.

16. An underfeed stoker comprising a stationary upwardly flaring retort member, a rotatable annular hearth member supported above and concentric with said retort, means for forcing fuel upwardly through said retort and hearth members to form a fuel bed, a pressure air chamber surrounding said retort, said hearth member and retort member together defining a partition separating the fuel bed from the air chamber, said partition containing a plurality of tuyère passages for discharging air from the air chamber into the fuel bed, the annular hearth member having an upwardly flaring upper surface for supporting an annular fuel and ash bed, means for rotating the hearth relative to the retort member, the pressure chamber wall having an annular flange whose plane is perpendicular to the axis of hearth rotation, hearth supporting means movably engaging the flange, means providing a passage communicating with the air chamber for directing a stream of air outwardly over the flange to remove ashes from the track of the hearth supporting means, means for rotating the hearth relative to the retort, an ash receiving hopper positioned beneath the flange in position to receive ashes therefrom, scraper fins turning with the hearth and positioned adjacent the upper surface of the flange to transfer ashes to the ash hopper, and means for removing ashes from the hopper.

17. An underfeed stoker comprising a stationary upwardly flaring retort member, a rotatable annular hearth member supported above and concentric with said retort, means for forcing fuel upwardly through said retort and hearth members to form a fuel bed, a pressure air chamber surrounding said retort, said hearth member and retort member together defining a partition separating the fuel bed from the air chamber, said partition containing a plurality of tuyère passages for discharging air from the air chamber into the fuel bed, the annular hearth member having an upwardly flaring upper surface for supporting an annular fuel and ash bed, means for rotating the hearth relative to the retort member, the pressure chamber wall having an annular flange whose plane is perpendicular to the axis of hearth rotation, hearth supporting means movably engaging the flange, means providing a passage communicating with the air chamber for directing a stream of air outwardly over the flange to remove ashes from the track of the hearth supporting means, means for rotating the hearth relative to the retort, an ash receiving hopper positioned beneath the flange in position to receive ashes therefrom, scraper fins turning with the hearth and positioned adjacent the upper surface of the flange, to transfer ashes to the ash hopper, means for removing ashes from the hopper, and a rake having one end pivoted to the ash hopper wall and the other end thereof disposed adjacent the upper edge of the hearth, forming means for preventing the formation of a clinker ring about the combustion zone.

18. An underfeed stoker comprising a stationary upwardly flaring retort member, an annular hearth member supported for rotation above the retort, about an axis concentric with the latter, means for rotating the hearth relative to the retort, means for forcing fuel upwardly through said retort and hearth to form a fuel bed, a pressure air chamber surrounding the retort, one of the aforesaid retort and hearth members containing tuyère passages through which air may flow from the pressure air chamber into the fuel bed, the hearth having an upwardly flaring upper surface for supporting an annular fuel and ash bed of sufficient depth to confine the flow of air entering through the tuyère passages to the central portion of the fuel bed within the retort and hearth, a flange positioned beneath the rotating hearth member in position to receive ashes discharged from the latter, an ash receiving hopper positioned underneath the flange, and means connected with the hearth for transferring ashes from the flange to the ash hopper.

19. In an underfeed stoker, the invention as claimed in claim 12, wherein an annular air orifice is provided between said hearth and said ash scraper ring to direct a cooling stream of air along the lower surface of said hearth.

20. In an underfeed stoker, the invention as claimed in claim 12, wherein said housing member extends above said flange to provide a cylindrical guide arranged to be engaged by the hearth supporting means to center said hearth relative to said retort.

IREAL A. WINTER.